United States Patent
Hancock et al.

(12) 
(10) Patent No.: US 6,547,113 B1
(45) Date of Patent: Apr. 15, 2003

(54) UNIVERSAL SNOWMOBILE HANDLEBAR BAG

(76) Inventors: Dennis Hancock, 5752 Silverstone Cr., Mountain Green, UT (US) 84050; Jefferey D. Hancock, 6702 S. 1800 East, Uintah, UT (US) 94405

(*) Notice: Subject to any disclaimer, the term of this patent is extended or adjusted under 35 U.S.C. 154(b) by 0 days.

(21) Appl. No.: 10/051,918

(22) Filed: Jan. 22, 2002

(51) Int. Cl.⁷ ............................................. B60R 9/05
(52) U.S. Cl. .................. 224/408; 224/420; 224/430; 383/38; 383/61.3
(58) Field of Search ................. 224/408, 199, 224/429, 430, 420, 646; D3/224; 383/38, 61.3

(56) References Cited

U.S. PATENT DOCUMENTS

| | | | | |
|---|---|---|---|---|
| 405,649 A | * | 6/1889 | Anderson | 224/199 |
| 501,821 A | * | 7/1893 | Browne | 224/582 |
| 1,136,691 A | * | 4/1915 | Mease | 224/199 |
| 4,153,092 A | * | 5/1979 | Haslam | 150/108 |
| 4,258,869 A | * | 3/1981 | Hilgendorff | 224/429 |
| 4,442,960 A | * | 4/1984 | Vetter | 224/417 |
| 4,966,260 A | * | 10/1990 | Young | 190/111 |
| 5,031,807 A | * | 7/1991 | Tiffany | 224/429 |
| 5,289,959 A | * | 3/1994 | Beeley et al. | 224/160 |
| 5,586,703 A | * | 12/1996 | Radar et al. | 224/601 |
| 5,634,579 A | * | 6/1997 | Baclawski | 224/637 |
| 5,890,639 A | * | 4/1999 | Hancock et al. | 224/429 |
| 6,135,333 A | * | 10/2000 | Tucker et al. | 224/646 |

* cited by examiner

*Primary Examiner*—Stephen P. Garbe

(57) ABSTRACT

A universal snowmobile handlebar bag having a first larger pouch and a second smaller pouch interconnected at upper edges therof by a flexible panel sized to fit across the central portion of a snowmobile handlebar with the pouches on opposite sides of the handlebar and with the side of the handlebar to which either bag is located being determined by the configuration of the snowmobile and with the access to and interior configuration of each pouch being determined by the size of the pouch.

3 Claims, 3 Drawing Sheets

UNIVERSAL SNOWMOBILE HANDLEBAR BAG

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to bags for use with snowmobiles and is intended to provide a bag that can be universally used with modern snowmobiles. Various kinds of bags have been proposed that can be draped over a portion of a snowmobile handlebar to hold relatively small items that a user may want to particularly handy during use of the snowmobile. All previous bags to be mounted on handlebars of snowmobiles of which we are aware can only be used with particular snowmobiles and are not readily adaptable for use with different models of snowmobiles or with snowmobiles manufactured by other manufactures. Also the previously known bags do not provide maximum carrying capacity when used on each of the wide variety of snowmobiles currently available for purchase.

BRIEF SUMMARY OF THE INVENTION

Principal objects of the present invention are to provide a universal bag for use on snowmobiles that can be quickly and easily positioned in front of a rider on the snowmobile to conveniently hold and protect small size articles such as matches, wallets, combs, eye glasses, pocket knives mirrors, and other safety, rescue or convenience items that the rider may desire to have immediately available during use of the snowmobile.

Another object is to provide a universal bag that will make maximum use of the available space at the center front of a snowmobile rider and that will not obstruct vision of the rider in observing gauges, i.e. fuel, speed, oil pressure, etc. whether the gauges are positioned in front or behind the handlebar of the snowmobile.

Principal features of the invention include a pair of centrally interconnected pouches, both pouches being small enough to fit against either a front side or a back side of a central handlebar portion. One pouch is larger than the other and at least the smaller pouch will pass through a curved grab bar mounted on the central section of a snowmobile handlebar. The grab bar allows a rider to grasp the bar when sitting, kneeling or standing and leaning on the snowmobile to control travel in various snow conditions. With an arcuate grab bar in place the space available for attaching a bag to the handlebar is often limited to the distance between the ends of the grab bar that are fixed to the handlebar. Releasable straps interconnect outer edges of the pouches to hold the universal bag on the handlebar. The snowmobile shown fragmentarily in FIG. 1 has a panel with gauges positioned forwardly a short distance in front of the handlebar but some snowmobiles have a greater distance between the handlebar and the gauges and a more limited space to the rear of the handlebar. With interconnected smaller pouch and larger pouch the universal bag can be positioned with either the large pouch or the smaller pouch positioned either behind or forward of the handlebar such that the installed universal bag does not obscure the gauges or interfere with access to a gas tank, lift seat or other components of the snowmobile.

Additional objects and features of the invention will become apparent to those skilled in the art to which the invention pertains from the following detailed description and drawings.

DETAILED DESCRIPTION OF THE INVENTION

Figure 1:
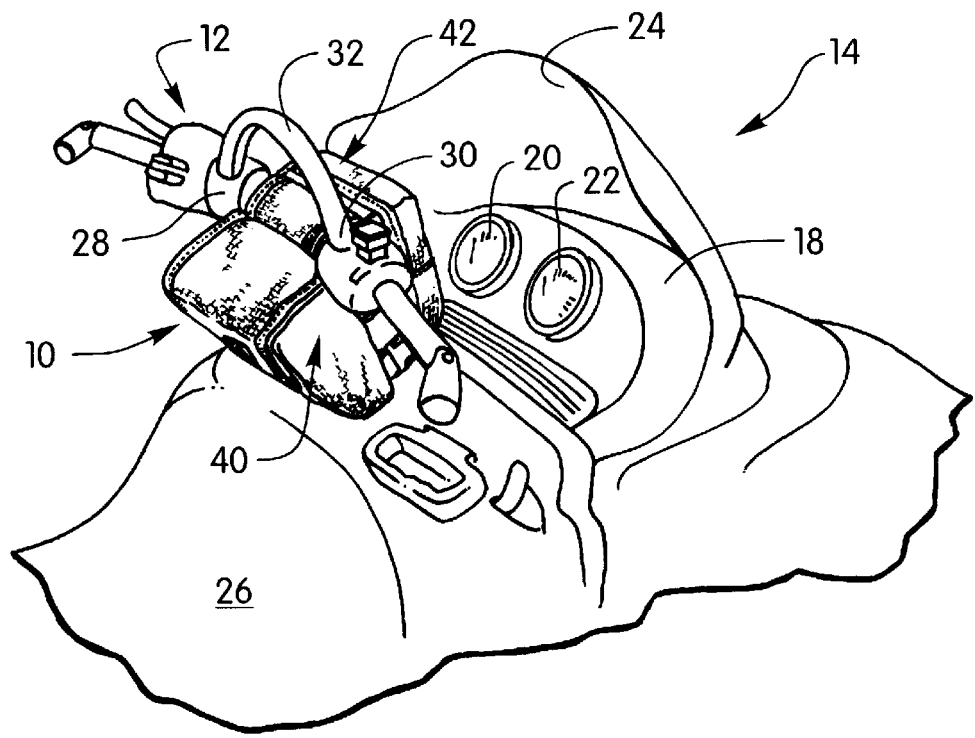
FIG. 1 is a partial fragmentary view of a snowmobile having a universal bag of the invention mounted on a handlebar of the snowmobile.
Figure 2:
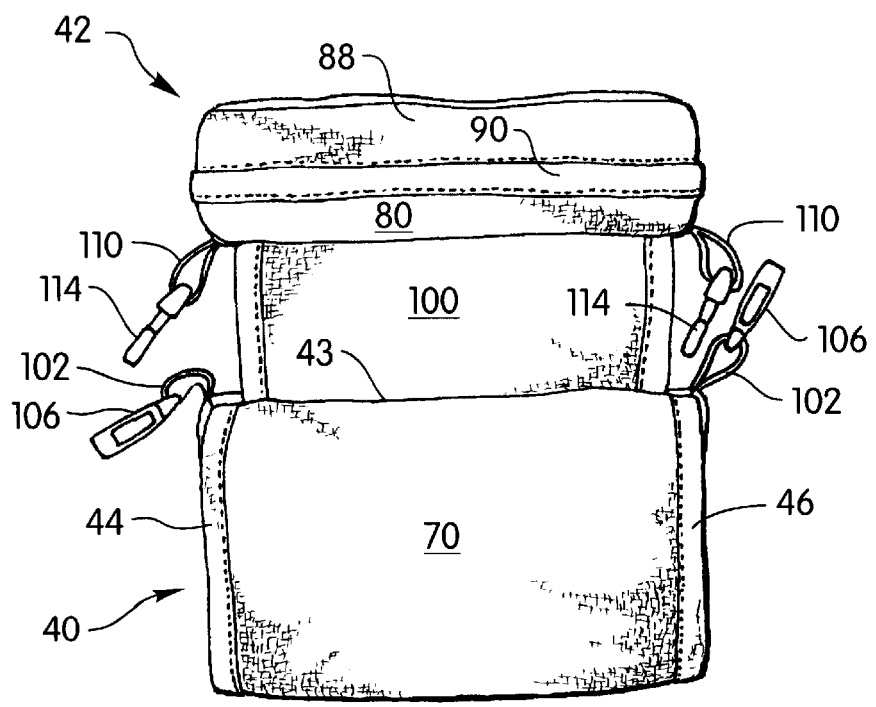
FIG. 2, a top plan view of the universal bag of the invention.
Figure 3:
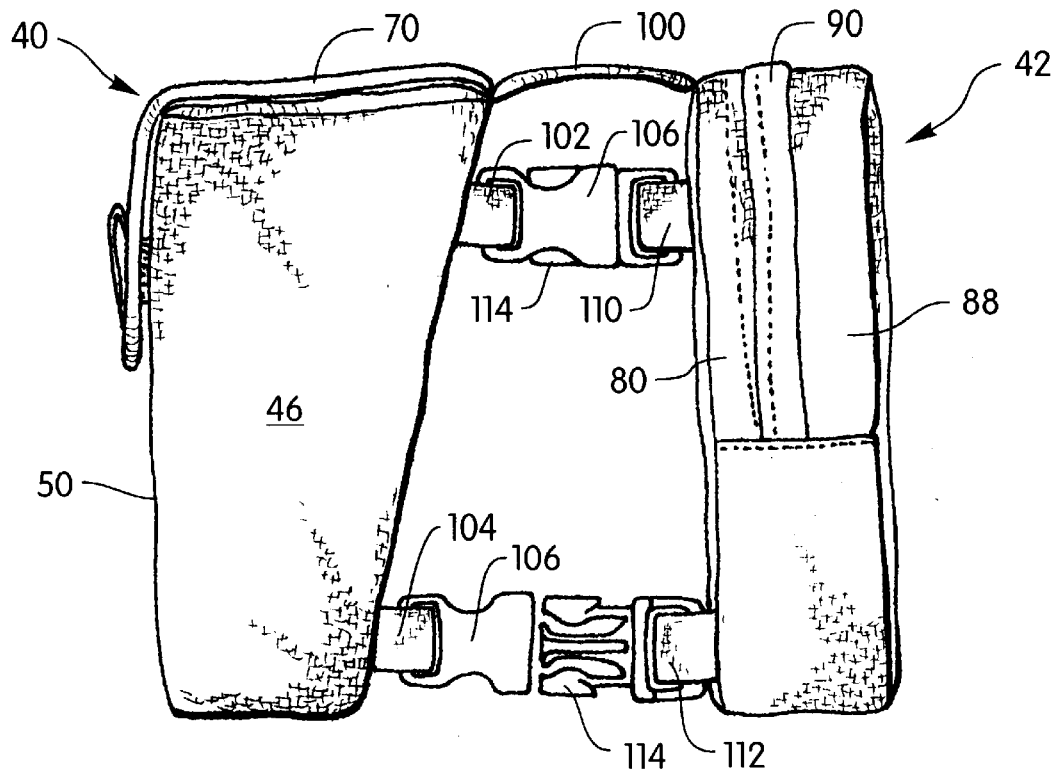
FIG. 3, a side elevation view.
Figure 4:
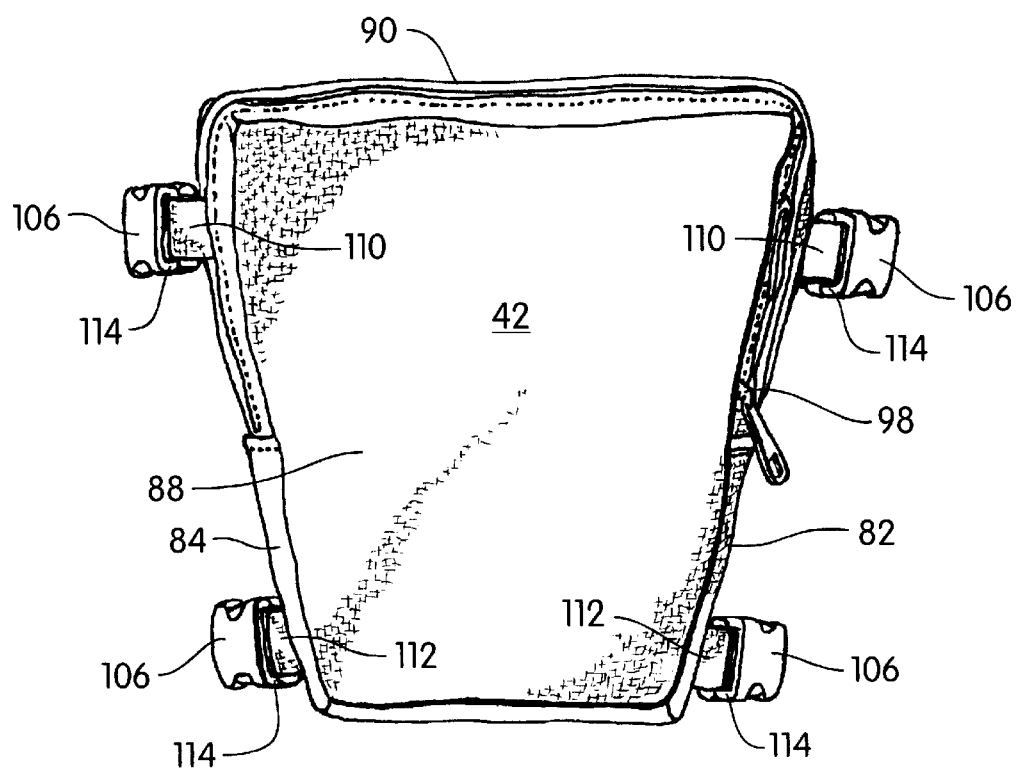
FIG. 4, a front view.
Figure 5:
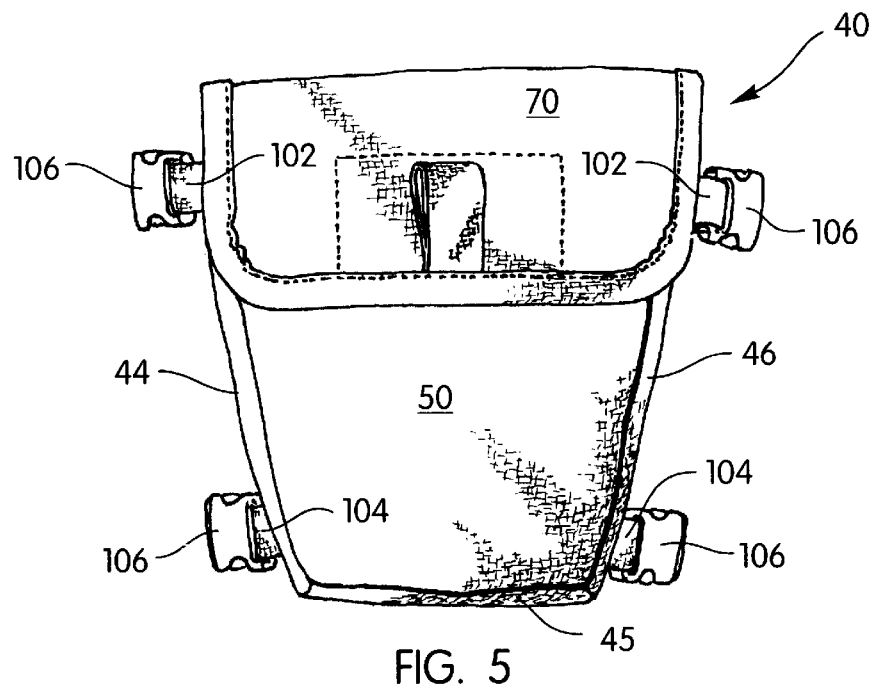
FIG. 5, a rear view.
Figure 6:
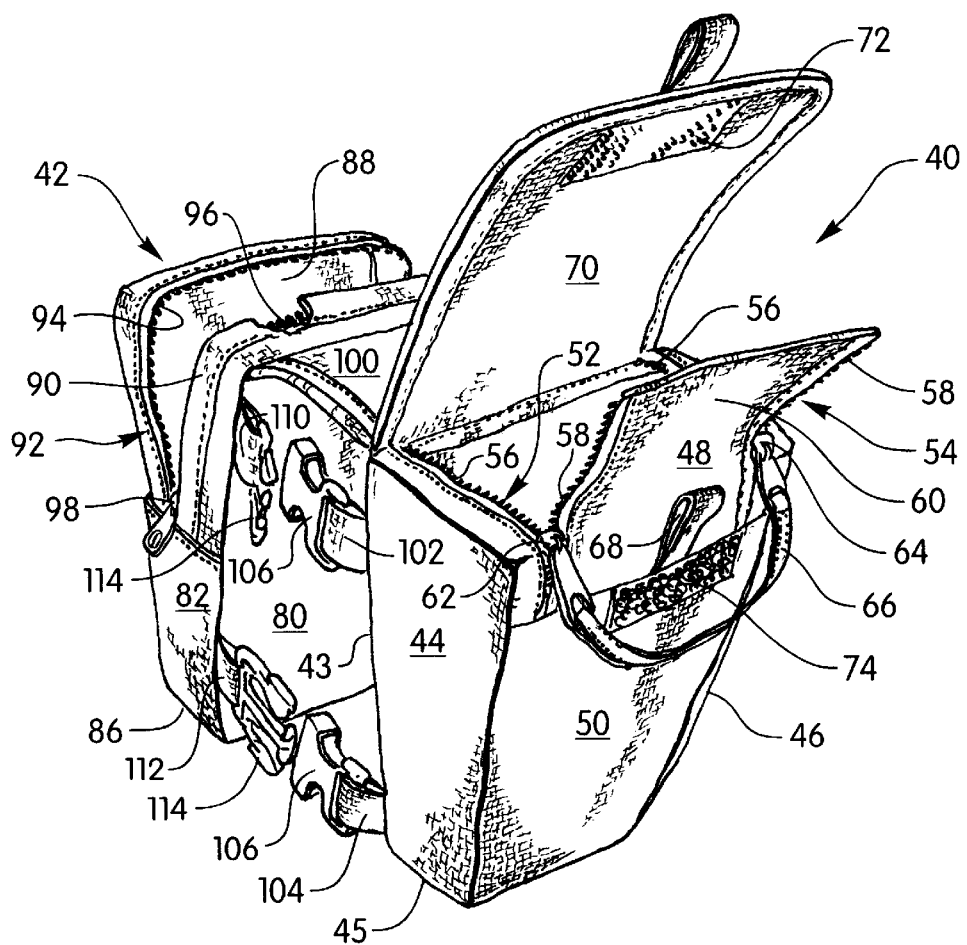
FIG. 6, a perspective view, with the pouches of the universal bag shown open.

Referring now to the drawings:

In the illustrated preferred embodiment, the universal bag 10 of the invention is shown mounted on the handlebar 12 of a snowmobile shown generally at 14. Snowmobile 14 includes a central console 18 with gauges 20 and 22 mounted therein to be visible to a rider of the snowmobile. A windshield 24 is mounted forwardly of console 18. A seat 26 is positioned to the rear of handlebar 12

Handlebar 12 has ends 28 and 30 of an arcuate grab bar 32 centrally mounted thereon.

Universal bag 10 includes a larger pouch 40 and a smaller pouch 42. The larger pouch 40 has a rear wall 43, a bottom 45 connected to spaced apart sidewalls 44 and 46 and an inner top cover or flap 48. The inner top cover is connected to and extends from a front wall 50 and is connected at opposite sides to the edges of the sidewalls. The inner top cover 48 also has a pair of spaced apart zippers 52 and 54 extending from above the front wall to the top of the rear wall. One track 56 of each of the zippers 52 and 54 is fixed to an outer portion of the inner top cover and the other zipper track 58 is fixed to a center portion 60 of the inner top cover 48. Zipper runner 62 travels on the tracks 56 and 58 of zipper 52 and a similar zipper runner 64 travels on tracks 56 and 58 of zipper 54. A flexible tether 66 interconnects the zipper runners 62 and 64 and a flexible tab 68 fastened centrally of the inner top cover at the junction of the inner top cover and the front wall 50. The tether 66 allows a user to simultaneously pull the zipper runners 62 and 64 and the tab 68 can be grasped to hold the assembly stable as the zipper runners are manipulated. An outer top cover or flap 70 extends fully across the rear wall 42 and extends from the rear wall to overlie the inner top wall. A "Velcro" fastener element 72 is fixed to the outer top cover to cooperate with a "Velcro" fastener element 74 on the front wall 50 in holding the outer top cover tightly closed over the inner top cover 48.

The smaller pouch 42 has a rear wall 80 interconnecting spaced sidewalls 82 and 84 extending partially up the rear wall. The sidewalls are also connected to a bottom 86 that is also connected to the rear wall 80. A front wall 88 is connected to the sidewalls and extends beyond the sidewalls. A top 90 interconnects the front wall with the rear wall 80. A zipper 92 has zipper tracks 94 and 96 sewn to a bottom surface 98 of the top 90 and a zipper runner 98.

A fabric panel 100 connects the rear walls 42 and 80 along their respective junctions with outer top cover 70 and top 90.

A pair of spaced apart, adjustable length straps 102 and 104 are sewn to opposite sides of the rear wall 42 of the larger pouch 40 and each strap has a receiver end 106 of a connector 108 on the end thereof Similarly, a pair of spaced apart straps 110 and 112 are sewn to opposite sides of rear wall 80 of the smaller pouch 42 and each strap has an insert of a connector 108 on the end thereof.

In use, the fabric panel 100 is placed over the central portion of the handlebar of a snowmobile with one pouch 40 or 43 in front of the handlebar and the other pouch at the rear of the handlebar. If placing the larger pouch 40 in front of the handlebar will obscure viewing of the gauges of the snowmobile the pouch is reversed to place the smaller pough 42 in front of the handlebar. The interior of the smaller pouch 42 is accessed through a single zipper running across the top of the pouch and is made just wide enough to accommodate the single zipper. The larger pouch 40 is made sufficiently wider that a pair of spaced apart zippers with tethered zipper runners running transverse to the front wall can be used to provide easy access to the interior of the larger pouch by a person wearing mittons or gloves. The larger pouch also has the overlapping outer top cover that can be easily opened or sealed closed even by a person wearing mittons or gloves. The combination of the two pouches of different widths allows the universal bag 10 to be positioned in an unobtrusive manner, with the inserts of the connectors locked into the receptacle of the connectors to secure the bag in place beneath the grab bar of the snowmobile.

Although a preferred embodiment of the invention has been herein disclosed, it is to be understood that such disclosure is by way of example and that other variations are possible without departing from the subject matter coming within the scope of the following claims, which subject matter we regard as our invention.

We claim:

1. A universal snowmobile handlebar bag comprising
   a first larger pouch having a front wall, a rear wall, spaced apart side walls interconnecting opposite edges of said front wall and said rear wall, a bottom interconnecting said front, rear, and sidewalls, a top inner flap connected to said rear wall and extending between said rear wall, said front wall and said side walls and connected by zippers to said sidewalls, and a top outer flap connected to said front wall and overlapping said top inner flap, sidewalls, said rear wall, and said rear wall;
   means to releasably secure said top outer flap in position overlying said top inner flap
   a second smaller pouch having a front wall, a rear wall, spaced apart side walls interconnecting opposite edges of said front wall and said rear wall, a bottom interconnecting said front, rear and side walls, a top interconnecting said front, rear, and side walls, and a zipper in said top wall and extending from one side wall to an opposite side wall;
   a flexible panel having one edge sewn to said first larger pouch at a junction of said rear wall and said outer cover of said first larger pouch and an opposite edge sewn to a junction of said rear wall and said top of said second smaller pouch, said length of said flexible panel between opposite edges; and
   coupling members spaced along and projecting from the junction of said sidewalls and said rear wall of said larger pouch; and
   cooperating coupling members spaced along and projecting from the junction of said rear wall and said sidewalls of said smaller pouch to engage and releasably interlock with said coupling members of said larger pouch.

2. A universal snowmobile handlebar bag as in claim 1, wherein
   said zippers of said first larger pouch have zipper runners interconnected by a tether.

3. A universal snowmobile handlebar bag as in claim 1 wherein
   said outer top flap has hook or loop material thereon; and
   said front wall has cooperating hook or loop material thereon, whereby said Velcro and
   said cooperating hook or loop material interconnect to releasably secure said outer top flap to said front wall.

\* \* \* \* \*